United States Patent [19]

Tamechika

[11] Patent Number: 5,686,766

[45] Date of Patent: Nov. 11, 1997

[54] ISLANDING-OPERATION PREVENTION APPARATUS, AND DISPERSED POWER GENERATION APPARATUS AND POWER GENERATION SYSTEM USING THE SAME

[75] Inventor: Masanari Tamechika, Nara, Japan

[73] Assignee: Canon Kabushiki Kaisha, Tokyo, Japan

[21] Appl. No.: 420,803

[22] Filed: Apr. 12, 1995

[30] Foreign Application Priority Data

| Apr. 12, 1994 | [JP] | Japan | 6-073626 |
| Mar. 22, 1995 | [JP] | Japan | 7-063220 |

[51] Int. Cl.$^6$ .................................................. H02J 3/06
[52] U.S. Cl. ........................ 307/43; 307/31; 307/32; 307/52; 307/38; 361/186; 361/187; 363/2; 363/13
[58] Field of Search ................................ 307/43, 32, 53, 307/87, 31, 52, 38; 323/906, 205; 363/2, 13; 361/186, 187

[56] References Cited

U.S. PATENT DOCUMENTS

| 4,445,049 | 4/1984 | Steigerwald | 307/45 |
| 4,788,619 | 11/1988 | Ott et al. | 361/91 |
| 5,111,377 | 5/1992 | Higasa et al. | 363/95 |
| 5,369,353 | 11/1994 | Erdman | 323/207 |

FOREIGN PATENT DOCUMENTS

| 0432269 | 6/1991 | European Pat. Off. | H02J 3/38 |
| 0570976 | 11/1993 | European Pat. Off. | H02M 7/48 |

OTHER PUBLICATIONS

"Method For Preventing Islanding Phenomenon On Utility Grid With A Number of Small Scale PV Systems" H. Kobayashi et al., 22 IEEE Photovoltaic Specialists Conference—1991, vol. 1, 7 Oct. 1991, USA, pp. 695–700.

"Utility Intertied Photovoltaic System Islanding Experiments" J. Stevens, 19 IEEE Photovoltaic Specialists Conference—1987, 4 May 1987, USA, pp. 1134–1138.

*Primary Examiner*—William M. Shoop, Jr.
*Assistant Examiner*—Albert W. Paladini
*Attorney, Agent, or Firm*—Fitzpatrick, Cella, Harper & Scinto

[57] ABSTRACT

Even when a plurality of dispersed power generation systems are connected to a utility gride, an islanding-operation prevention apparatus can easily and assuredly prevent an islanding operation of each dispersed power supply constituting the corresponding dispersed power generation system. The apparatus includes a breaker provided between the utility gride and a dispersed power supply, an electric-power-value detector for detecting a value of electric power from a power line connected to the utility gride, a switch for electrically connecting or disconnecting an electric-power changing device for changing the value of electric power to the power line in accordance with an output from a pulse circuit, and a controller for controlling the breaker in accordance with the width of fluctuations of the value of electric power during the connection or the disconnection. A dispersed power generation apparatus and a dispersed power generation system uses such an apparatus. By further providing a synchronous circuit for synchronizing the output of the pulse circuit with a signal output from a reference-signal source, even if the amount of the generated power and the amount of a load are in a complete equilibrium state during an islanding operation, the islanding operation can be assuredly prevented with a short time period until the stop of the islanding operation and without using large-scale equipment.

6 Claims, 9 Drawing Sheets

ISLANDING-OPERATION PREVENTION APPARATUS, AND DISPERSED POWER GENERATION APPARATUS AND POWER GENERATION SYSTEM USING THE SAME

BACKGROUND OF THE INVENTION

1. Field of the Invention

This invention relates to an islanding-operation prevention apparatus of a dispersed power generation system for, for example, supplementing a large-scale power plant. More particularly the invention relates to an apparatus for assuredly preventing an islanding operation without using large-scale equipment even if a plurality of dispersed power generation systems are connected, and a dispersed power generation apparatus and a power generation system using the islanding-operation prevention apparatus.

2. Description of the Related Art

Figure 5:
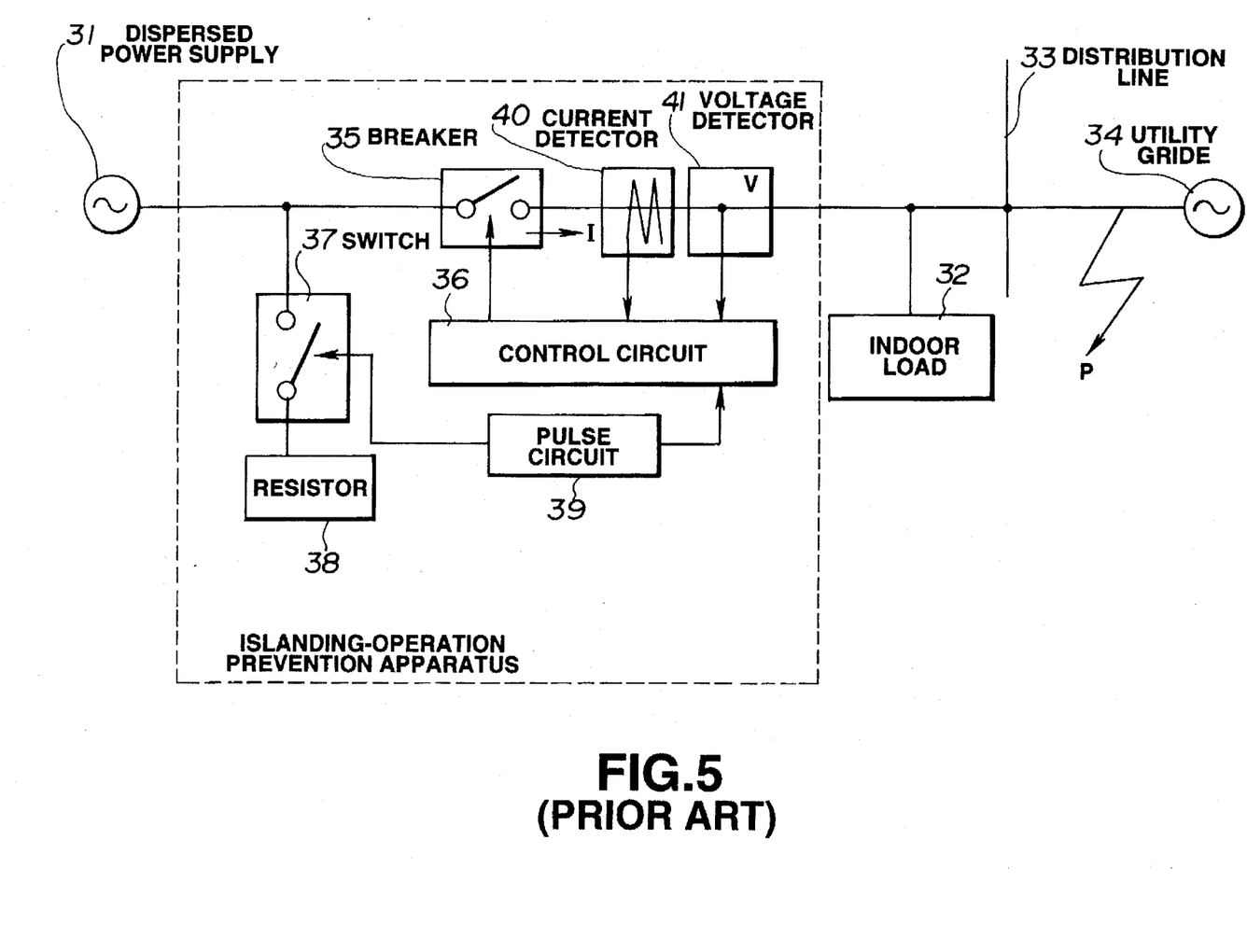
FIG. 5 is a block diagram illustrating the configuration of an islanding-operation prevention apparatus for the purpose of comparison with the prevent invention.

A load fluctuation method has generally been adopted for islanding-operation prevention apparatuses of this kind. FIG. 5 illustrates the configuration of a dispersed power generation system including an islanding-operation prevention apparatus 30, which adopts the load fluctuation method, for the purpose of comparison with the system of the present invention. In FIG. 5, the output of a dispersed power supply 31, comprising a solar cell comprising photoelectric transducers, a wind power plant or the like, connected to a utility grid 34 via a customer load 32 and a distribution line 33 is supplied to a resistive light load 38 via a switch 37, which is switched on for a very short time period of equal to or less than 1 millisecond with a period of about 0.3 seconds by a pulse circuit 39. At the same time, the voltage V of a breaker 35 at the side of the utility grid 34 is measured by a voltage detector 41 every time the switch 37 is switched on and off.

Accordingly, the light load 38 connected to the dispersed power supply 31 is inserted in the utility grid during the short time period at the predetermined period. For example, during grounding at an accident point P, when the voltage V at the power line (between the dispersed power supply 31 and the utility grid 34) while the light load 38 is inserted exceeds a predetermined variation width, the breaker 35 opens in response to the output of a control circuit 36, so that the dispersed power supply 31 is separated from the utility grid 34 after the utility grid 34 has failed.

Figure 4:
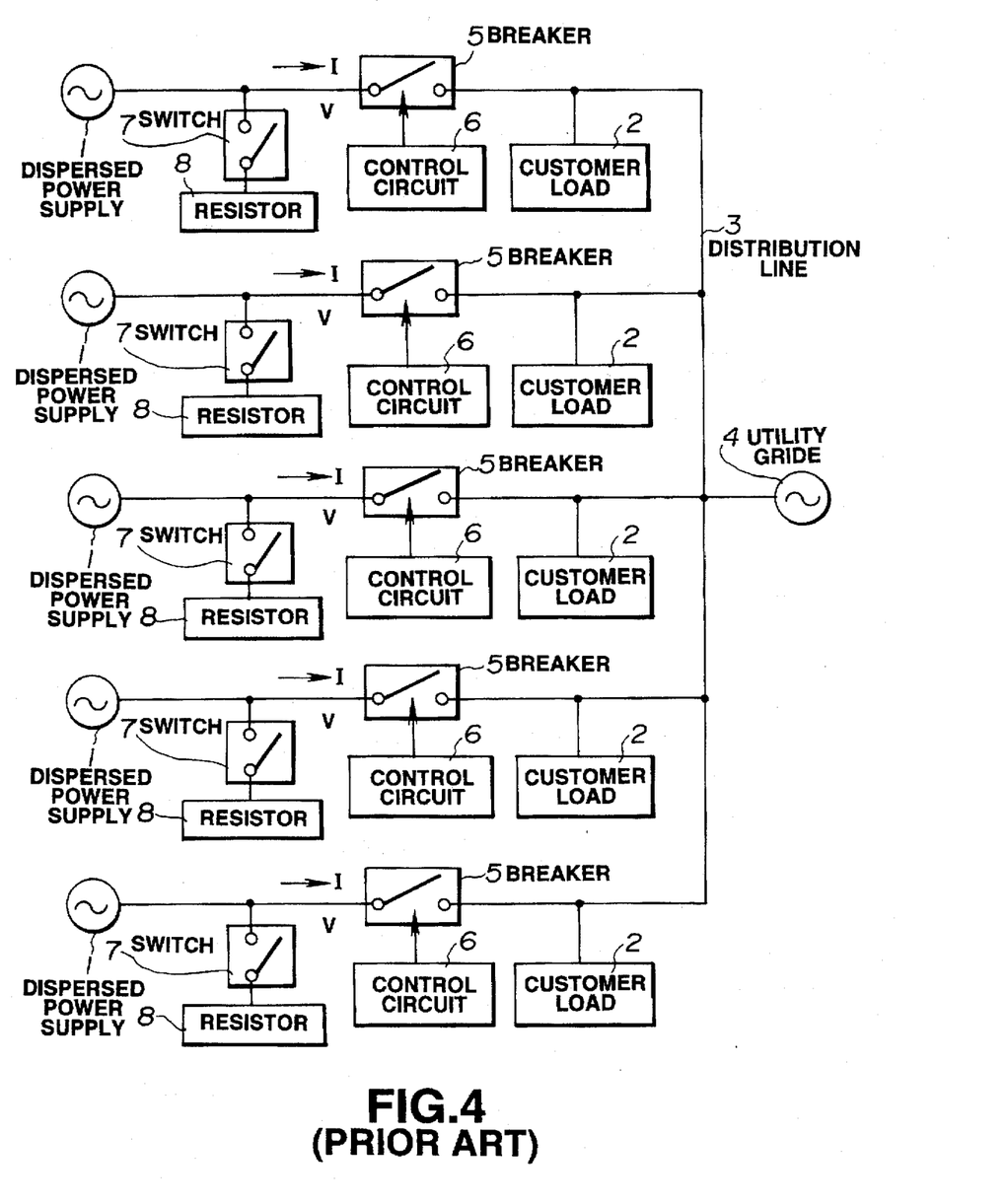
FIG. 4 is a block diagram illustrating the configuration of an example in which five islanding-operation prevention apparatuses are connected to the same distribution line and utility grid.

However, conventional islanding-operation prevention apparatuses, such as the above-described apparatus 30, are configured assuming a case in which the apparatus is applied to only a single dispersed power generation system. If, for example, as shown in FIG. 4, a plurality of dispersed power generation systems are connected in parallel to a utility grid 4, the following problems arise.

That is, when electric power is supplied from the utility grid 4 to a distribution line 3 in an ordinary state, since the capacity of a resistor 8, serving as a light load, is about twenty percents of the rated power of a dispersed power supply 1, and the impedance of the utility grid 4 is sufficiently small, the voltage V of the power line when a switch 7 is switched on drops little. The reverse-charging preventing effect of the light load 8 increases as fluctuations of the output power increase. However, if the fluctuations of the output power are too large, fluctuations of electric power frequently occur, thereby degrading the quality and the stability of the electric power.

When the dispersed power supplies 1 are separated from the utility grid 4 and individually operate, a plurality of light loads 8 are connected in parallel at the load side when the switches 7 are switched on. Since the voltage V at the power line has a value obtained by multiplying the output current of the dispersed power supply 1 by the impedance of the load side, if the timings of connection of the respective light loads 8 are shifted with respect to each other (for example, if only the light load 8 of a dispersed power generation system is connected), the amount of reduction of the equivalent impedance of the load side becomes too small because the systems are connected in parallel, and therefore the width of drop of the voltage V at the power line becomes too small. It has become clear that in such a case, the corresponding control circuit 6 which must operate does not operate in some cases.

SUMMARY OF THE INVENTION

It is an object of the present invention to provide an apparatus which can easily and assuredly prevent an islanding operation of each dispersed power supply constituting the corresponding dispersed power generation system even when a plurality of dispersed power generation systems are connected to a utility grid.

According to one aspect, the present invention, which achieves the above-described object, relates to an islanding-operation prevention apparatus comprising breaking means provided between a utility grid and a dispersed power supply, electric-power-value detection means for detecting a value of electric power from a power line connected to the utility grid, connection means for electrically connecting or disconnecting electric-power changing means for changing the value of electric power to the power line in accordance with an output from a pulse circuit, control means for controlling the breaking means in accordance with the width of fluctuations of the value of electric power during the connection or the disconnection, and synchronous means for synchronizing the output of the pulse circuit with a signal output from a reference-signal source, and a dispersed power generation apparatus and a dispersed power generation system using the islanding-operation prevention apparatus. Synchronizing means for synchronizing the output of the pulse circuit with a signal output from a reference-signal source is further provided.

In one embodiment, the signal output of the reference-signal source comprises a frequency signal of the utility grid.

In another embodiment, the signal output of the reference-signal source comprises a radio signal.

In still another embodiment, the radio signal comprises a time signal of public broadcasting.

In still another embodiment, the radio signal comprises a time signal of an artificial satellite.

In still another embodiment, the signal output comprises a time signal of a telephone line.

In still another embodiment, the electric-power-value detection means detects a value of voltage of the utility grid.

In still another embodiment, the electric-power-value detection means detects a value of voltage and a value of current of the utility grid.

In still another embodiment, the electric-power changing means comprises a resistive and/or reactive load.

In still another embodiment, the output of the pulse circuit has a pulse width shorter than the half period of the frequency of utility.

In still another embodiment, the dispersed power supply includes a selected one of a solar cell, a wind power generator, a hydraulic power generator, and a fuel cell.

In still another embodiment, the dispersed power supply includes electric-power conversion means for converting electric power output from the solar cell, the wind power generator, the hydraulic power generator, and the fuel cell.

In still another embodiment, the dispersed power supply includes a battery for storing electric power output from the solar cell, the wind power generator, the hydraulic power generator, and the fuel cell.

In still another embodiment, the battery comprises at least selected one of a lithium secondary battery, a nickel-hydrogen battery and a lead-acid battery.

In still another embodiment, the pulse circuit comprises a crystal oscillator and a frequency divider.

In still another embodiment, the breaker also functions as a home breaker.

In still another embodiment, the signal output of the reference-signal source comprises an output of a reference-signal source of an islanding-operation prevention apparatus of another dispersed power generation system.

According to the configuration of the present invention, since a plurality of electric-power changing means, each serving as a resistive and/or reactive small load, are simultaneously brought in a distribution line in synchronization with a reference signal, a plurality of islanding-operation prevention apparatuses connected to the distribution line can simultaneously operate. Hence, the occurence of a state in which each islanding-operation prevention apparatus does not operate influenced by another dispersed power supply can be prevented.

DETAILED DESCRIPTION OF THE PREFERRED EMBODIMENTS

The inventor of the present invention has found that in dispersed power generation systems connected in parallel, when preventing an islanding operation of each system using fluctuations of electric power of each of the dispersed power generation systems, if each system is independently driven, fluctuations of electric power become, in some cases, much smaller than a desired width of fluctuations.

Taking into consideration such a phenomenon, the present invention can easily and assuredly prevent an islanding operation state by synchronously driving electric-power changing means.

The present invention will now be described with reference to the drawings.

Figure 1:
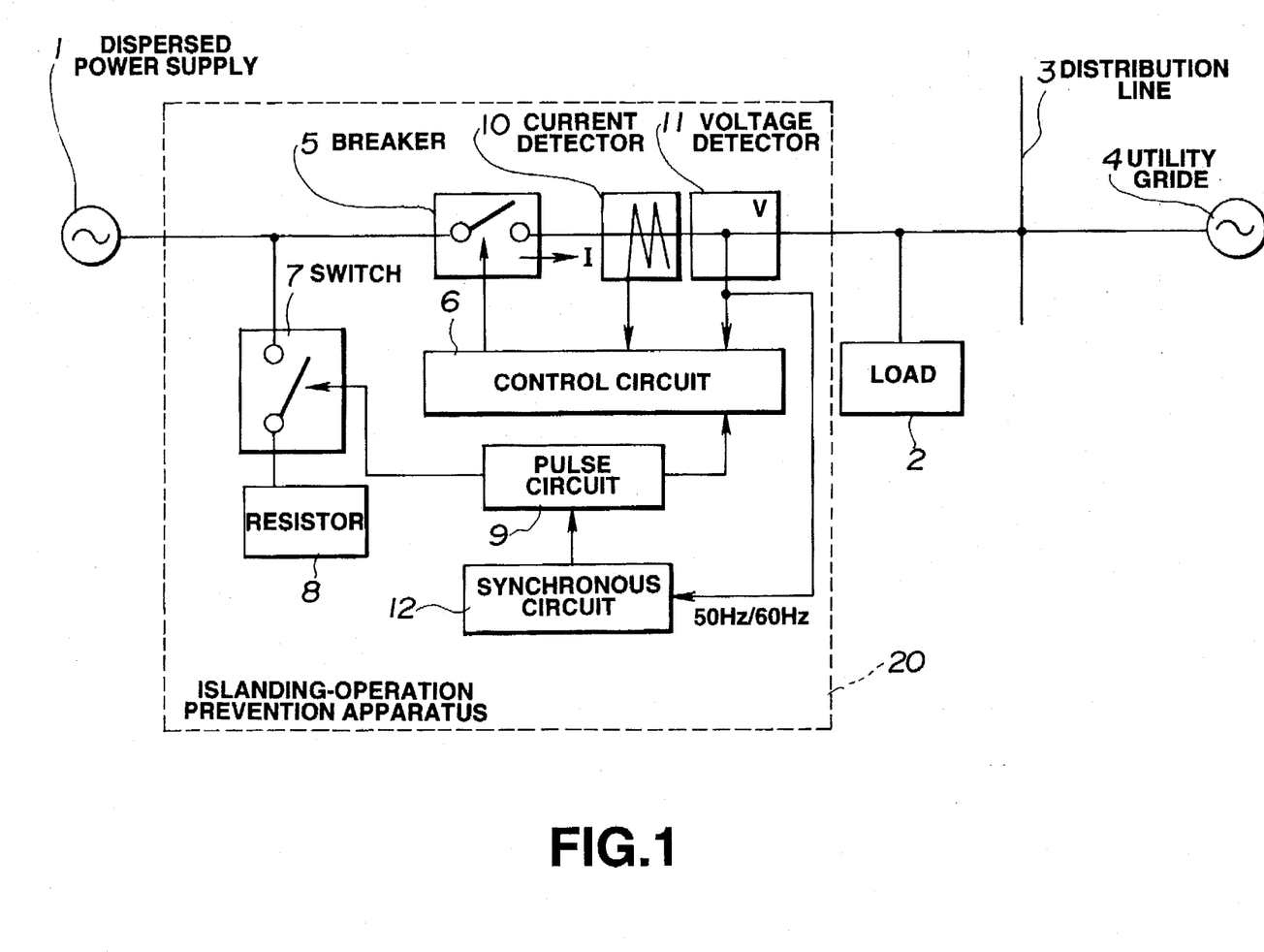
FIG. 1 is a block diagram illustrating the configuration of a dispersed power generation system according to a first embodiment of the present invention.

FIG. 1 is a dispersed power generation system according to a first embodiment of the present invention.

Dispersed Power Supply 1

Figure 6:
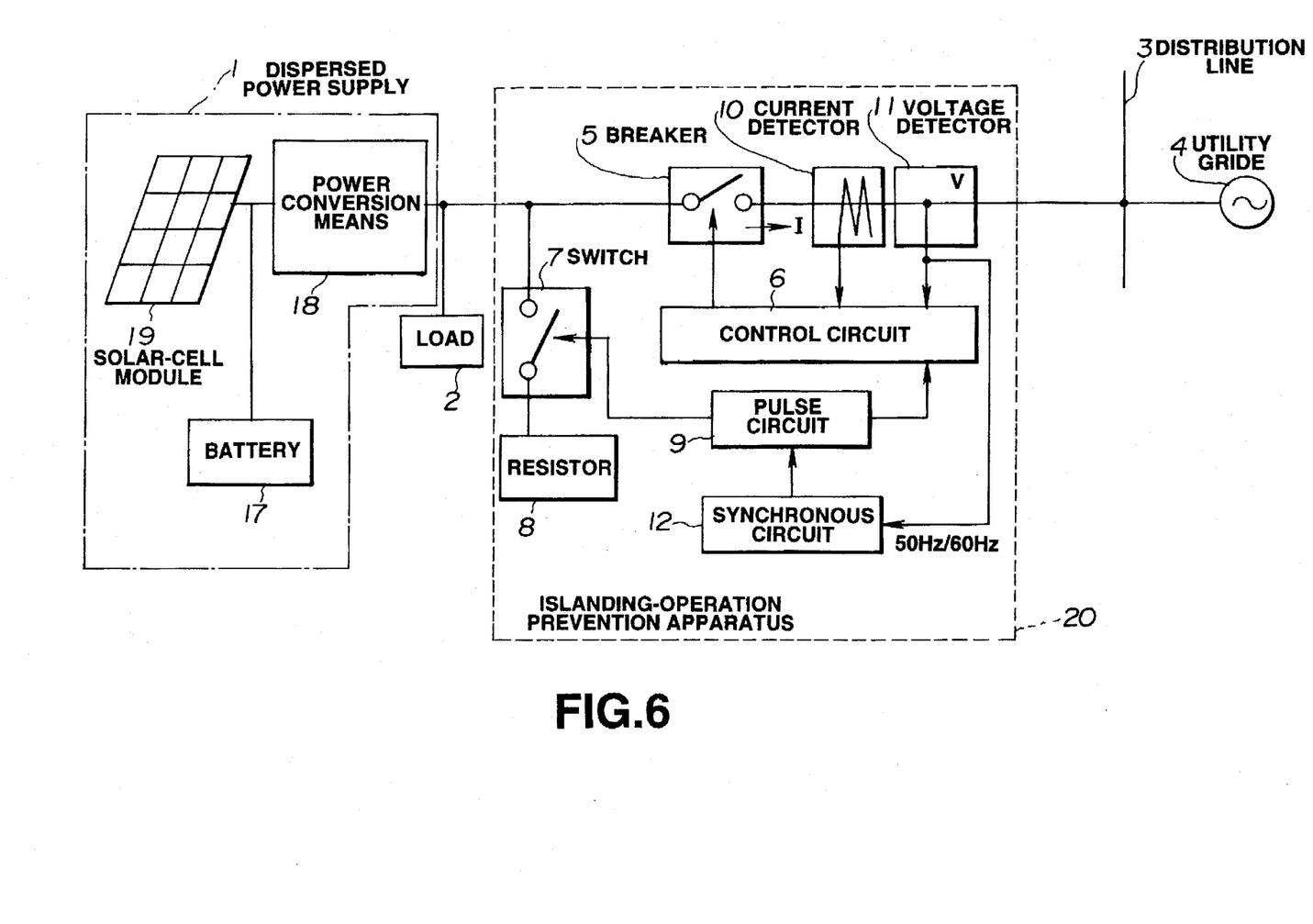
FIG. 6 is a block diagram illustrating the configuration of a dispersed power generation system according to a fourth embodiment of the present invention.

A power supply capable of supplying electric power using a solar cell, serving as a photoelecric transducer, a wind power generator, a hydraulic power generator, a fuel cell or the like, and more specifically, as shown in FIG. 6, a power supply, in which a solar-cell module 19 is connected to power conversion means (an inverter) 18 and a secondary battery 17, can be suitably used as a dispersed power supply 1 of the present invention.

Load 2

Figure 2:
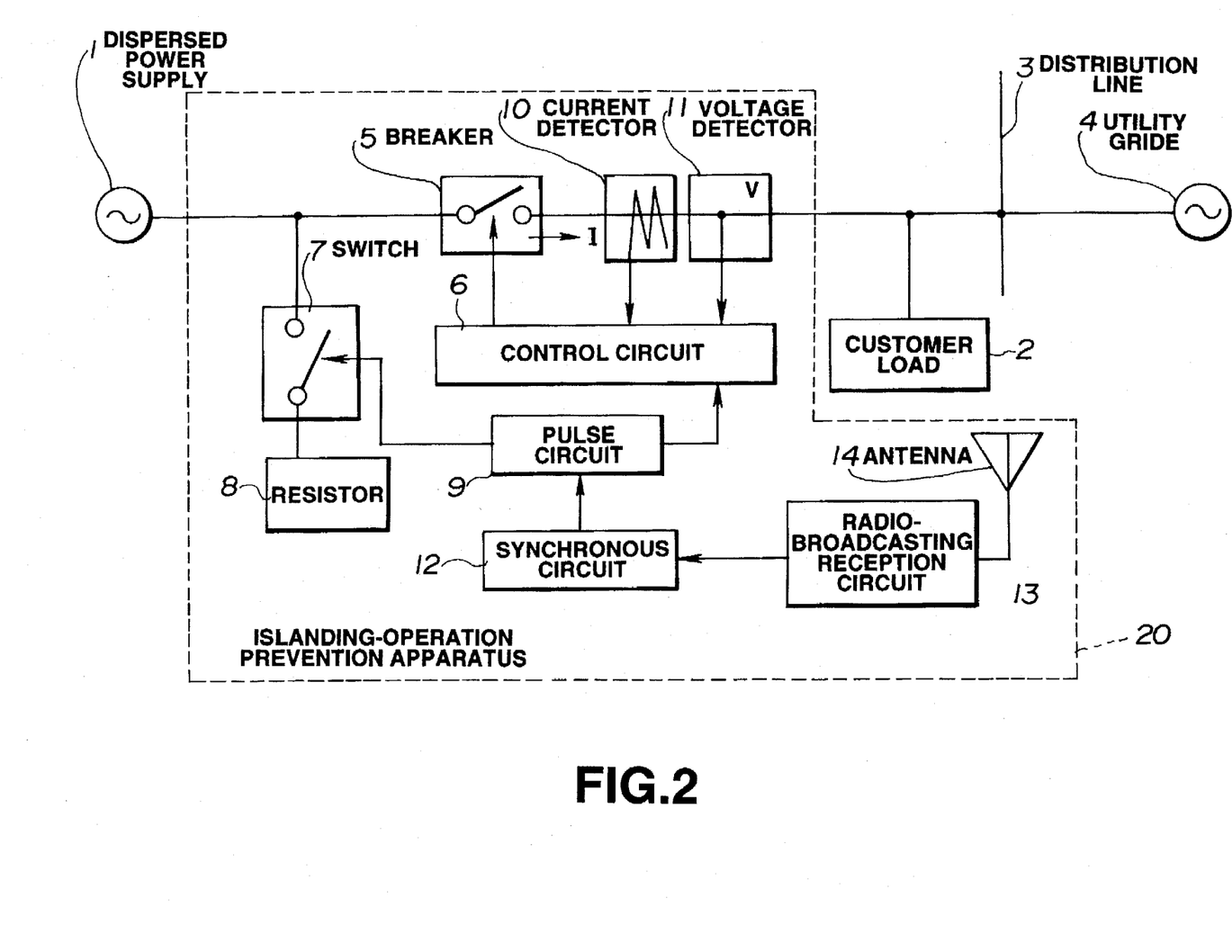
FIG. 2 is a block diagram illustrating the configuration of a dispersed power generation system according to a second embodiment of the present invention.
Figure 3:
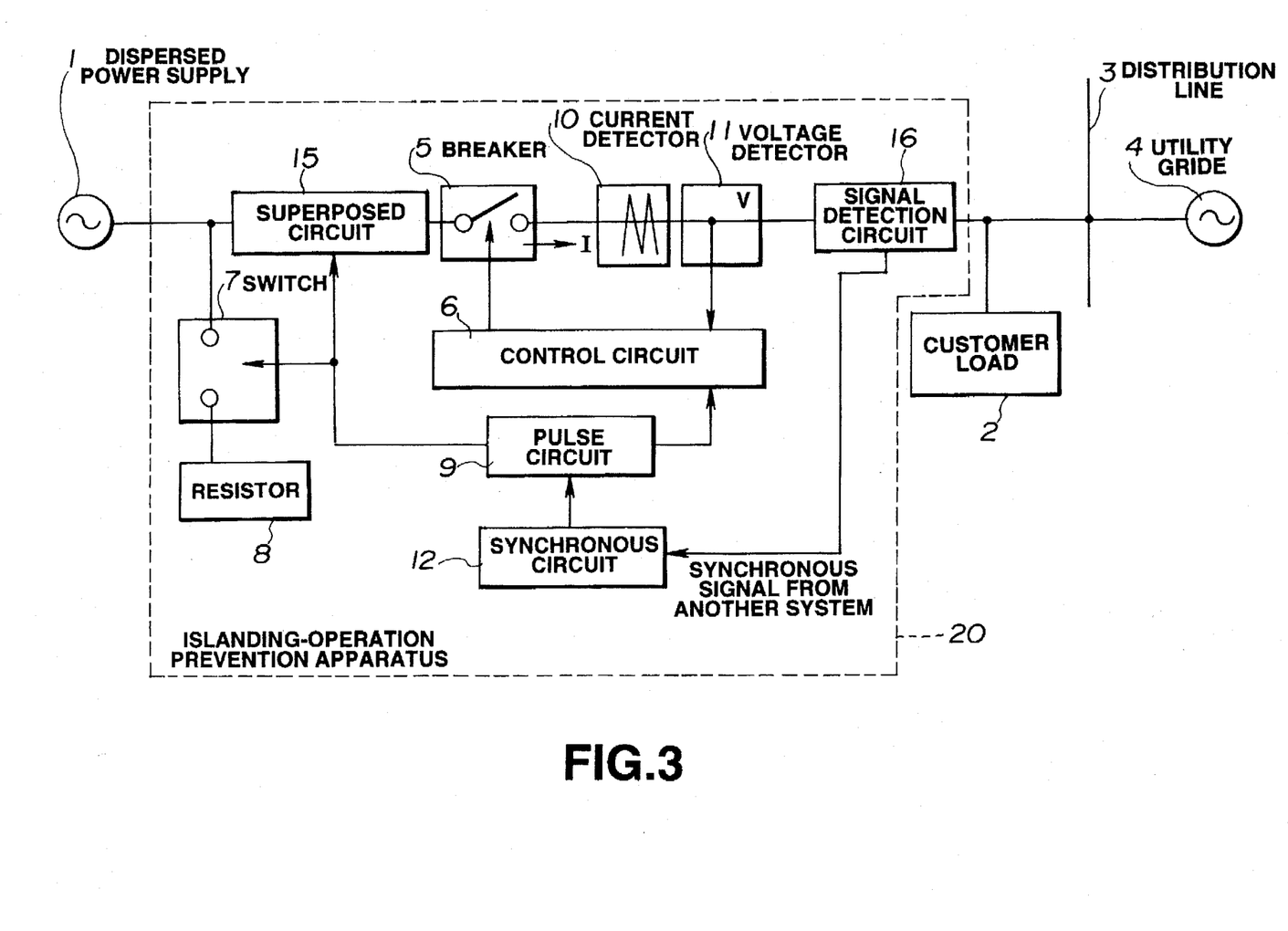
FIG. 3 is a block diagram illustrating the configuration of a dispersed power generation system according to a third embodiment of the present invention.

In FIGS. 2 and 3, although a customer load 2 is shown as a load representing various kinds of electronic apparatuses which are usually used, it also represents a load, a secondary battery or the like which is used outdoors.

Distribution Line 3

A distribution line 3 is a line for supplying electric power from the power supply side to the power demand side.

Utility Grid 4

A utility grid 4 may comprise a large-scale power plant/substation for supplying commercial electric power, or a medium-scale power generator installed within a factory.

Breaker 5, Serving as Breaking Means

Any device of a mechanical type or a semiconductor type which can provide electrical connection or disconnection between the dispersed power supply 1 and the utility grid 4 may be used as a breaker 5. The breaker 5 may also be used as a breaker for power distribution, such as a breaker for home use, a breaker for factory use or the like. The breaker 5 may also be provided between the load 2 and the dispersed power supply 1 so as to assuredly disconnect electric power supply. Alternatively, the breaker 5 may be provided between the load 2 and the utility grid 4 so as to prevent an islanding operation, and the load 2 may be driven by the dispersed power supply 1, a separately provided secondary battery, or the like.

Control Circuit 6, Serving as Control Means

Any device, which can open the breaker 5 by determining the occurrence of an islanding operation by a change in electric power due to on/off of a switch 7 or the like, may be used as a control circuit 6. The control circuit 6 may be configured by a one-chip microprocessor or the like.

Switch 7, Serving as Connection Means

A relay of a mechanical type or a semiconductor type which is switched on by a pulse signal from a pulse circuit 9 may be used as the switch.

Load 8, Serving as Electric-Power Changing Means

A load 8 can provide such fluctuations in electric power that the control circuit 6 can detect the occurrence of an islanding operation, and has a minimum necessary value so as not to influence the quality of generated electric power of the dispersed power supply during a steady-state operation. The load 8 may comprise either a resistive load or a reactive load.

Pulse Circuit 9

The pulse circuit 9 generates a periodic pulse signal for switching on the switch 7. It may comprise, for example, a crystal oscillator and a frequency divider. When a synchronizing signal has been generated from a synchronous circuit 12, the timing to generate a pulse signal is synchronized with the synchronizing signal. When the synchronous circuit 12 has generated a high-frequency synchronous signal synchronizing with the frequency of utility, the pulse signal may have the same frequency as the synchronizing signal.

Current Detector 10 and Voltage Detector 11, Deriving As Electric-Power Detection Means A current detector 10 detects the current flowing through the power line and transmits the detected value to the control circuit 8. Either an analog device or a digital device may be used as the current detector 10.

A voltage detector 11 detects the voltage of the power line and transmits the detected value to the control circuit 9. Either an analog device or a digital device may be used as the voltage detector 11.

Synchronous Circuit 12, Serving as Synchronizing Means

The synchronous circuit 12 outputs a synchronizing signal for correcting the period of the pulse signal generated by the pulse circuit 9. The synchronizing signal synchronizes with a reference signal, such as frequency of utility, a time signal or the like. If the pulse circuit 9 is configured by an oscillator having a relatively high accuracy, such as a crystal oscillator or the like, the synchronizing signal may be generated at least once in a day. However, if the pulse circuit 9 is configured by an oscillator having a relatively low accuracy, the synchronizing signal must be generated at least once in a minute.

Radio-Broadcasting Reception Circuit 13

A radio-broadcasting reception circuit 13 receives a time signal of radio broadcasting. The synchronous circuit 12 forms a synchronizing signal from the extracted time signal.

Antenna 14

An antenna 14 receives radio broadcasting.

Superposing Circuit 15

A superposing circuit 15 superposes a synchronizing signal on the power distribution line.

Signal Detection Circuit 16

A signal detection circuit 16 detects a synchronizing signal generated by another islanding-operation prevention apparatus and superposed on the power distribution line.

Battery 17

A lithium secondary battery or a lithium ion battery having a large storage capacity, or a nickel-hydrogen battery or a lead-acid battery which is inexpensive is suitably used as a battery 17.

Power Conversion Means 18

When a power supply used as a dispersed power supply is an AC power supply, it is preferable to use an AC—AC converter as power conversion means 18 in order to perform adjustment with the load 2. When the power supply is a DC power supply, a DC-AC converter (inverter) is used as the power conversion means 18, which is connected to the utility grid 4.

Next, embodiments of the present invention will be described in detail with reference to the drawings.

First Embodiment

Figure 7:
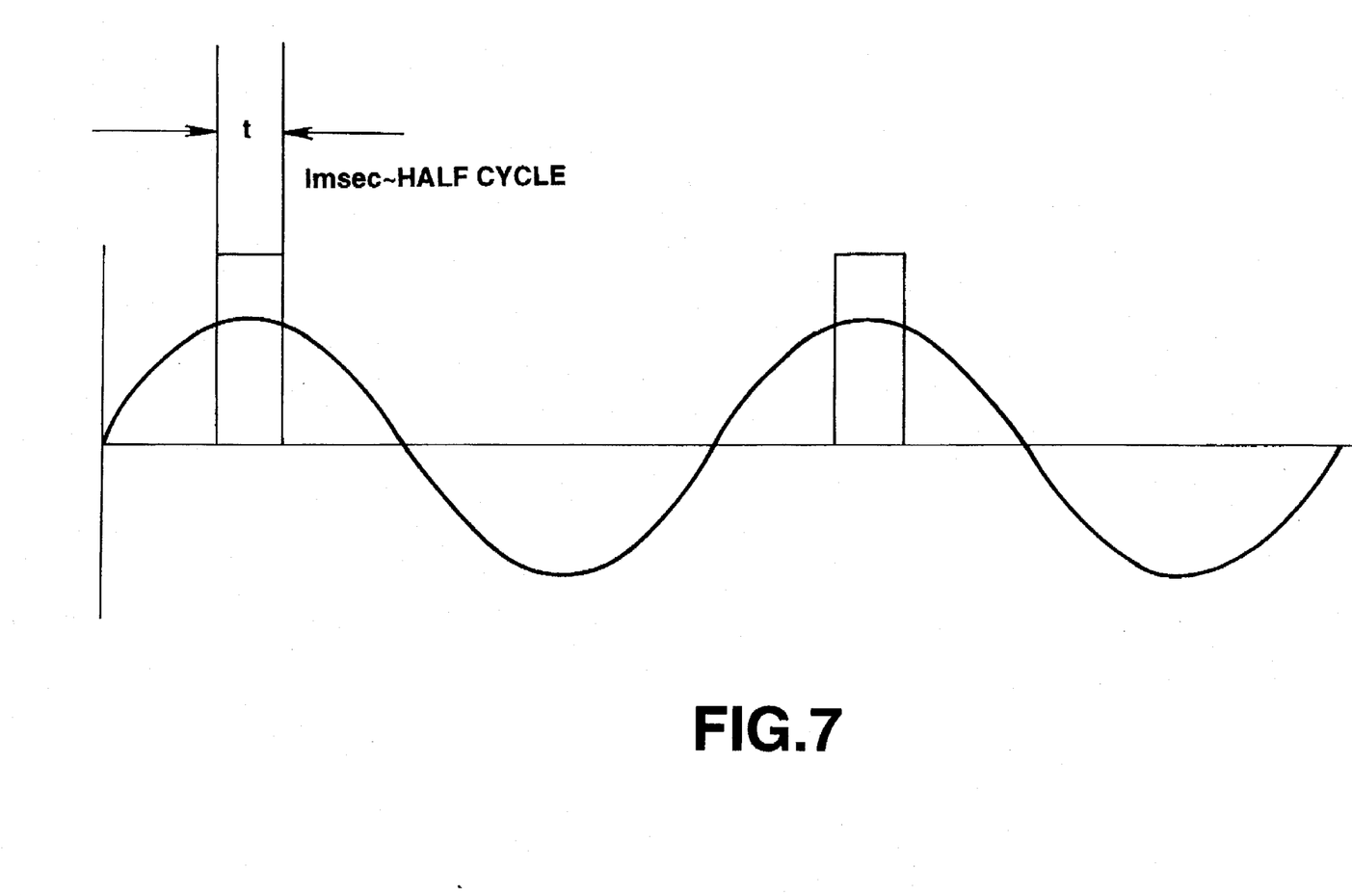
FIG. 7 is a wave-form chart illustrating the output timing of a pulse circuit in the first embodiment.

In the first embodiment, as shown in FIG. 1, the synchronous circuit 12 provides a signal input to the pulse circuit 9. That is, the synchronous circuit 12 outputs a synchronizing pulse signal which synchronizes with the waveform of the voltage of the utility grid 4 in response to the output of the voltage detector 11 provided in the power line. Accordingly, the switch 7 is switched on at a timing having a pulse width t as shown in FIG. 7 with a period of $1/50$ second in the 50-Hz zone, and with a period of $1/60$ second in the 60-Hz zone. In the present embodiment, in order to improve operational accuracy, the current detector 10 and the voltage detector 11 are provided in the power line so that the current I and the voltage V can be detected while the switch 7 is switched on and off. In the following description, a case of detecting the voltage V will be shown as an example.

As shown in the description of the related art, when electric power is ordinarily supplied from the utility grid 4 to the distribution line 3, the voltage V drops little when the switch 7 is switched on.

On the other hand, in an islanding operation state in which the utility grid 4 is disconnected from the distribution line 3, the voltage V has a value obtained by multiplying the output current of the dispersed power supply 1 (comprising a solar-cell module of USSC Corporation connected to the power conversion means 18 in the present embodiment) by the load impedance. When the switch 7 is switched on, the resistive load 8 is connected to the customer load 2 in parallel, the equivalent load impedance of the dispersed power supply 1 decreases. Since the synchronous circuit 12 is provided, even if a plurality of similar power generation systems are connected to the single distribution line 3, the resistive load 8 is simultaneously connected. Accordingly, the load impedance of the entire system decreases so that the operation of each islanding operation prevention apparatus is not influenced. On the other hand, since the output current is constant, the voltage V drops by a value corresponding to the decrease of the load impedance.

That is, even if a plurality of dispersed power generation systems are connected to the single distribution line 3, an islanding operation state of each of the systems can be assuredly and inexpensively prevented. In other words, when a change in the voltage in the power line while the switch 7 is switched on and off has been detected, the control circuit 8 opens the breaker 5 to disconnect the dispersed power supply 1 from the distribution line 3, whereby an islanding operation state can be assuredly prevented.

Figure 8:
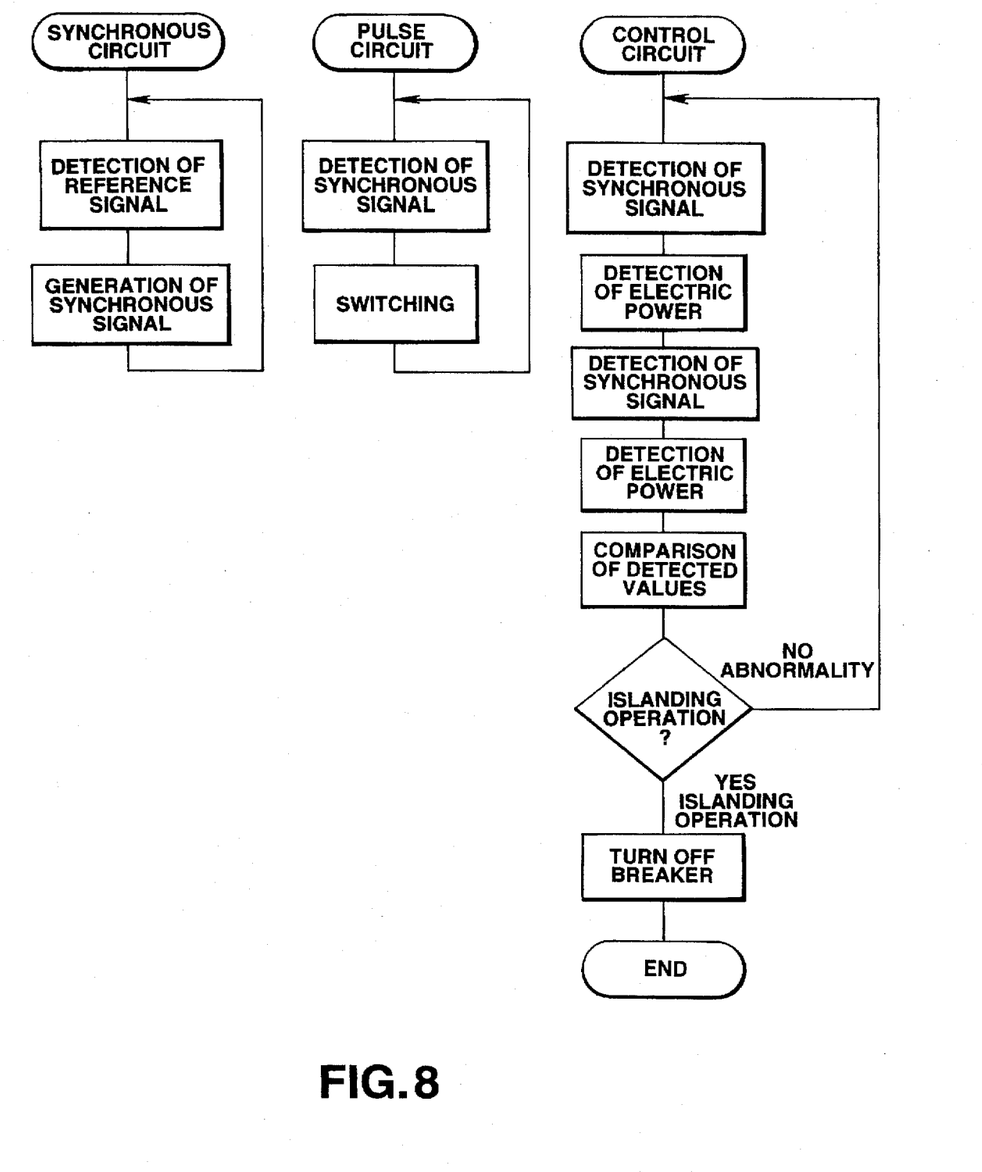
FIG. 8 is a flowchart illustrating the operation of the dispersed power generation system of the first embodiment.

The islanding-operation prevention apparatus may be disposed within the DC-AC converter (the inverter), serving as the power conversion means. FIG. 8 is a flowchart illustrating the operation of the first embodiment.

Second Embodiment

FIG. 2 illustrates a dispersed power generation system according to a second embodiment of the present invention. In FIG. 2, the same components as those in the first embodiment are used except a portion relating to the synchronous circuit 12.

In the present embodiment, a time signal of public broadcasting is used as a reference-signal source for the synchronous circuit 12. That is, a time signal of an AM/FM radio wave is received by the radio-broadcasting reception circuit 13 having a product name SA-159 made by System Arts Co., Ltd via the antenna 14 in the best reception state, and the synchronous circuit 12 provides the time signal as the synchronizing signal to the pulse circuit 9. The switch 7 is switched on for an arbitrary time period with an arbitrary period (0.5 seconds with a period of 3 seconds in the present embodiment) by the pulse circuit 9, comprising, for example, a crystal oscillation circuit. The timing of the switching is corrected every hour by the synchronizing signal.

Thus, also in the second embodiment as in the first embodiment, even if a plurality of dispersed power generation systems are connected to the single distribution line 3, an islanding operation state of each of the systems can be assuredly detected. Furthermore, in the second embodiment, since the synchronous circuit 12 uses an external reference-signal source, the timing of switching on the switch 7 can be arbitrarily determined. Any other time signal than the above-described time signal, such as a time signal from an artificial satellite, a time signal from a telephone line, or the like, may, of course, be used as the reference-signal source.

Third Embodiment

In a third embodiment of the present invention, as shown in FIG. 3, a synchronizing signal from another dispersed power generation system connected to the distribution line 3 is used as a reference-signal source for the synchronous circuit 12. That is, the synchronizing signal from the other system detected by the signal detection circuit 18 is supplied to the pulse circuit 9 via the synchronous circuit 12, and the switch 7 is controlled in synchronization with a pulse signal from the pulse circuit 9. Of course, when a signal from another system is not detected, the islanding-operation preventing function is automatically operated assuming that there is no other distributed power generation system.

Other components than the synchronous circuit 12 operate in the same manner as in the first embodiment.

The pulse signal is also input to the signal superposing circuit 15, and is superposed on the voltage of the system power supply as a synchronizing signal. The other system detects the synchronizing signal and performs the above-described operation.

Thus, also in the third embodiment as in the first embodiment, even if a plurality of dispersed power generation systems are connected to the single distribution line 3, an islanding operation state of each of the systems can be assuredly prevented. Furthermore, in the third embodiment, since the timing of switching of the switch 7 can be arbitrarily determined and the timing of the synchronizing signal can be corrected with a shorter time period instead of every hour, a precise oscillator such as a crystal oscillation circuit is unnecessary, so that the pulse circuit 9 can be inexpensively configured.

The synchronizing signal superposed on the voltage of the utility grid must not degrade the quality of the electric power of the distribution system. More specifically, the total distortion factor of the synchronizing signal must be equal to or less than 5%, and must be equal to or less than 3% in the ratio with respect to the basic wave of the frequency. That is, the pattern of the synchronizing signal must be different from that of the detected synchronizing signal. When, for example, detecting a signal of 125 kHz/20 mV for 0.05 seconds, a synchronizing signal of 165 kHz/100 mW is output in synchronization therewith. The distortion factor in the present embodiment was equal to or less than 0.02%.

Figure 9:
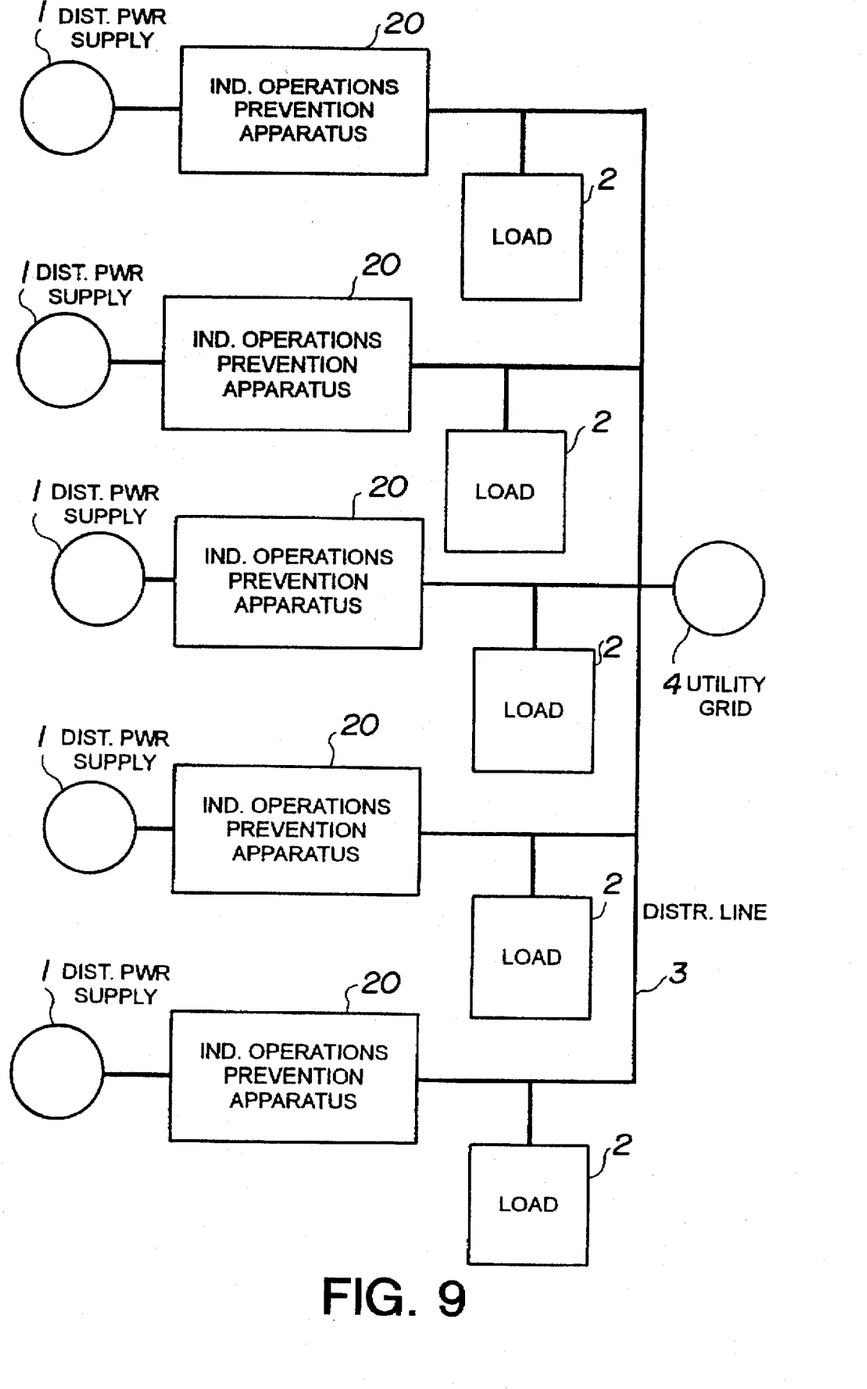
FIG. 9 is a block diagram illustrating the arrangement of five island-operation preventing apparatuses according to the invention connected to the same distribution line and utility grid.

FIG. 9 illustrates the arrangement of five islanding-operation prevention apparatuses 20 between dispersed power supplies 1 and utility grid 4 with loads 2 at the connections of the island-operation prevention apparatuses 20 to utility grid 4. The island-operation preventing apparatuses shown in FIGS. 1–3 may be used in FIG. 9.

Fourth Embodiment

In a fourth embodiment of the present invention, as shown in FIG. 6, the load 2 shown in FIG. 1 is moved between the dispersed power supply 1 and the islanding-operation prevention apparatus 20.

According to this configuration, even if the utility grid 4 is short-circuited, the dispersed power supply 1, comprising a solar-cell module and a lead-acid battery, serving as the battery 17, can stably supply electric power to the load 2 while assuredly preventing an islanding operation. The same operation can be obtained even if the lead-acid battery is replaced by a lithium ion battery.

Fifth Embodiment

In a fifth embodiment of the present invention, the same components as in the fourth embodiment are used except that a wind power generator and an AC—AC converter, serving as the power conversion means 18, connected thereto are used as the dispersed power supply 1 instead of the solar-cell module and the power conversion means 18. Also in the fifth embodiment, the same operation as in the first embodiment can be obtained.

Accordingly, the present invention provides an islanding-operation prevention apparatus comprising breaking means provided between a system power supply and a dispersed power supply, electric-power-value detection means for detecting a value of electric power from a power line connected to the utility grid, connection means for electrically connecting or disconnecting electric-power changing means for changing the value of electric power to the power line in accordance with an output from a pulse circuit, and control means for controlling the breaking means in accordance with the width of fluctuations of the value of electric power during the connection or the disconnection, and a dispersed power generation apparatus and a dispersed power generation system using the islanding-operation prevention apparatus.

By further providing synchronous means for synchronizing the output of the pulse circuit with a signal output from a reference-signal source, even if the amount of the generated power and the amount of a load are in a complete equilibrium state, an islanding operation can be assuredly prevented with a short time period until the stop of the islanding operation and without using large-scale equipment.

By using an output of a reference-signal source of an islanding-operation prevention apparatus of another dispersed power generation system, or a frequency signal of the utility grid as the signal output of the reference-signal source, an inexpensive apparatus can be provided. By using a radio signal, such as a time signal of public broadcasting or a time signal of an artificial satellite, or a time signal of a telephone line as the signal output of the reference-signal source, it is possible to inexpensively obtain an arbitrary reference signal, or to simplify the apparatus.

By detecting a value of voltage of the utility grid by the electric-power-value detection means, the apparatus can be relatively stably operated.

By detecting a value of voltage and a value of current of the utility grid by the electric-power-value detection means, the apparatus can be accurately operated.

By using a resistive and/or reactive load as the electric-power changing means, the apparatus can be operated in a simple manner.

By configuring the apparatus such that the output of the pulse circuit has a pulse width shorter than the half period of the frequency of utility, the apparatus can be simplified, a wider range of energy can be utilized.

By configuring the apparatus such that the dispersed power supply includes a selected one of a solar cell, a wind power generator, a hydraulic power generator, and a fuel cell.

By configuring the apparatus such that the dispersed power supply includes electric-power conversion means for converting electric power output from the solar cell, the wind power generator, the hydraulic power generator, and the fuel cell, connection with the load can be easily performed.

By configuring the apparatus such that the dispersed power supply includes a battery for storing electric power output from the solar cell, the wind power generator, the hydraulic power generator, and the fuel cell, an independent operation can be performed while preventing an islanding operation.

By configuring the apparatus such that the battery comprises at least selected one of a lithium secondary battery, a nickel-hydrogen battery, and a lead-acid battery, an independent operation can be performed in a simple manner.

By configuring the apparatus such that the pulse circuit comprises a crystal oscillator and a frequency divider, the apparatus can be accurately operated.

By configuring the system such that the breaker also functions as a breaker for power distribution, the apparatus can be simplified.

The individual components shown in outline or designated by blocks in the drawings are all well known in the islanding-operation prevention apparatus, dispersed power plant and power generation system arts and their specific construction and operation are not critical to the operation or the best mode for carrying out the invention.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A utility linking system comprising:

a utility grid; and a plurality of distribution systems each including:
   a dispersed power supply being connected in parallel to the utility grid,
   a first distribution line for connecting the utility grid to the dispersed power supply,
   detection means, provided on the first distribution line, for detecting a voltage outputted to the first distribution line or an electrical current flowing in the first distribution line,
   breaking means, provided on the first distribution line and situated closer to the dispersed power supply than the detection means, which is capable of setting both a connecting state and a disconnecting state between the utility grid and the dispersed power supply and generally sets the connecting state,
   a second distribution line provided between the dispersed power supply and the breaking means,
   a pulse circuit for emitting a pulse, and
   switching means, connected to the second distribution line, for performing a switching operation in response to the pulse emitted from the pulse circuit, wherein said utility linking system further comprises:
   a plurality of control means, each provided to each of the plurality of distribution systems, for comparing each of output values respectively outputted from each of the plurality of detection means with each of output voltage values respectively outputted to each of the plurality of second distribution lines through the intermediary of each of the plurality of switching means, and commutating, in the case where at least one of the comparison results shows a fluctuation which is greater than the predetermined amount, the breaking means provided in the corresponding distribution system from the connecting state to the disconnecting state; and
   a plurality of synchronization circuits for setting each number of the pulses respectively emitted from the plurality of pulse circuits each provided in the plurality of distribution systems to a predetermined number.

2. A utility linking system according to claim 1, wherein said plurality of synchronization circuits respectively respond to the frequency of the utility grid.

3. A utility linking system according to claim 1, wherein said plurality of synchronization circuits respectively respond to the frequency of a broadcasting electric wave.

4. A utility linking system according to claim 1, wherein each of said plurality of dispersed power supplies is a generator having a solar cell.

5. A utility linking system according to claim 1, wherein each of said plurality of distribution systems further comprises a battery.

6. A utility linking system according to claim 1, wherein said battery is a lithium secondary battery or a nickel-hydrogen secondary battery.

* * * * *

UNITED STATES PATENT AND TRADEMARK OFFICE
CERTIFICATE OF CORRECTION

PATENT NO. : 5,686,766
DATED : November 11, 1997
INVENTOR(S) : Masanari TAMECHIKA It is certified that error appears in the above-identified patent and that said Letters Patent is hereby corrected as shown below:

At [57] ABSTRACT
    Line 3, "gride" should read —grid—.
    Line 8, "gride" should read "grid"; and
    Line 10, "gride" should read "grid".

Column 3

Line 49, "prevent" should read --present--.

Column 5

Line 15, "circuit 8." should read --circuit 6.--.

Signed and Sealed this

Fifth Day of May, 1998

Attest:

BRUCE LEHMAN

*Attesting Officer*       *Commissioner of Patents and Trademarks*